United States Patent

Kaneko

[19]

[11] Patent Number: 6,134,493
[45] Date of Patent: Oct. 17, 2000

[54] METHOD AND APPARATUS FOR INTERLOCKING ENTRANCE OF UNMANNED DUMP TRUCK INTO WORK AREA

[75] Inventor: Kiyoshi Kaneko, Urawa, Japan

[73] Assignee: Komatsu Ltd., Tokyo, Japan

[21] Appl. No.: 09/117,307

[22] PCT Filed: Jan. 16, 1997

[86] PCT No.: PCT/JP97/00063

§ 371 Date: Jul. 29, 1998

§ 102(e) Date: Jul. 20, 1998

[87] PCT Pub. No.: WO97/26589

PCT Pub. Date: Jul. 24, 1997

[30] Foreign Application Priority Data

Jan. 18, 1996 [JP] Japan .................................. 8-024591

[51] Int. Cl.[7] .............................................. G06F 165/00
[52] U.S. Cl. .............................. 701/50; 701/23; 701/25; 340/988
[58] Field of Search .................................. 701/23, 24, 25, 701/50, 300, 301; 340/988, 994; 180/167, 168, 169; 318/587

[56] References Cited

U.S. PATENT DOCUMENTS

| | | | |
|---|---|---|---|
| 5,546,311 | 8/1996 | Sekine ..................................... | 701/301 |
| 5,586,030 | 12/1996 | Kemner et al. ........................... | 701/50 |
| 5,848,368 | 12/1998 | Allen et al. .............................. | 701/50 |
| 5,897,595 | 4/1999 | Hawkins et al. .......................... | 701/50 |
| 5,906,646 | 5/1999 | Kemner .................................... | 701/50 |
| 5,913,914 | 6/1999 | Kemner et al. ........................... | 701/50 |
| 5,925,081 | 7/1999 | Hawkins et al. .......................... | 701/50 |
| 5,931,875 | 8/1999 | Kemner et al. ........................... | 701/50 |
| 5,961,560 | 10/1999 | Kemner .................................... | 701/24 |

FOREIGN PATENT DOCUMENTS 64-078303 3/1989 Japan .
5-127746 5/1993 Japan .

*Primary Examiner*—Gary Chin
*Attorney, Agent, or Firm*—Sidley & Austin

[57] ABSTRACT

The present invention is a method and an apparatus for preventing the entrance of an unmanned dump truck, so that an interference and a collision between the unmanned dump trucks and a working vehicle in the working area are prevented. In the method, an unmanned dump truck (3) enters the working area (91) only when another dump truck (3a) is not in the working area (91) and the working vehicle (92) in the working area (91) issues an entrance permission command. The apparatus includes entrance permission means (22), provided on the working vehicle (92), and computing means (11), for outputting a control command thus permitting the unmanned dump truck (3) to enter only when another dump truck (3a) is not in the working area (91) and an entrance permission command is inputted into the apparatus.

8 Claims, 4 Drawing Sheets

6,134,493

METHOD AND APPARATUS FOR INTERLOCKING ENTRANCE OF UNMANNED DUMP TRUCK INTO WORK AREA

TECHNICAL FIELD

The present invention relates to a method and an apparatus for preventing the entrance of an unmanned dump truck into a work area, so that interference and collision between vehicles are prevented, and the invention particularly relates to a method and an apparatus for preventing the entrance of an unmanned dump truck when the unmanned dump truck enters the inside of a loading area where a loader works.

BACKGROUND ART

Conventionally, an unmanned dump truck driving system is well known as a system for transporting earth and sand by a dump truck in a wide range of quarries or the like. The examples of the aforementioned unmanned dump truck driving system are as described below. Teaching a traveling course of an unmanned dump truck has been previously conducted by a specified method, and the coordinate data at each predetermined distance on the traveling course, or at predetermined times, are stored in a storage device. During automatic traveling, the unmanned dump truck confirms the current position at each predetermined sampling time, and the deviation between the actual traveling position and the aforementioned traveling course data, as previously stored, is computed. The steering, vehicle speed, and starting and stopping of the unmanned dump truck are controlled to decrease the deviation, so that the unmanned dump truck is controlled to travel along the traveling course previously stored.

Normally, at specified positions in an unmanned dump truck driving system, a loading site is provided, in an excavating and quarrying site (commonly called a face, and hereinafter referred to as a face), where earth and sand or the like are loaded into the rear deck of the unmanned dump truck, and an earth discharging site (commonly called a hopper, and hereinafter referred to as a hopper) is provided where earth and sand or the like, which have been loaded, are discharged. A plurality of unmanned dump trucks travel between the loading site and the hopper along an automatic traveling course, and repeatedly conduct the operation of discharging the earth and sand or the like, which have been loaded by a loader at the loading site, into the hopper. In such an unmanned dump truck driving system, in many cases, a plurality of unmanned dump trucks are traveling in close proximity to one another in a working area, for example, a loading site, and it is important to prevent collision between these unmanned vehicles.

As a method relating to the prevention of collision, a method for controlling the traveling of an unmanned motor vehicle, such as an unmanned dump truck, is disclosed in, for example, Japanese Laid-open Patent Application No. 5127746. FIG. 5 shows a traveling control method, in a loading area 91 around a face, where a loader (working vehicle) 92 works. The unmanned dump truck 3 has position detecting means (not illustrated) for detecting its current position in a coordinate system on an automatic traveling course 96. The unmanned dump truck 3 travels automatically, with the speed, steering, and the like being controlled by a control means (not illustrated), so as to decrease the deviation obtained by comparing the course data, previously determined by teaching or the like, to the current position detected by the position detecting means. In one embodiment, a plurality of unmanned dump trucks 3, 3a, and 3b are traveling on the same automatic traveling course 96. The unmanned dump truck 3 transmits its current position to other unmanned dump trucks 3a and 3b by means of a transmitter (not illustrated), and receives the current positions of the other unmanned dump trucks 3a and 3b by means of a receiver (not illustrated), so that they recognize the positions of each other.

At the face, the loader 92 loads the unmanned dump truck 3a at a predetermined position. FIG. 5 shows a situation in which the unmanned dump truck 3a stops at a loading position 2. At this point, it is assumed that the other unmanned dump trucks 3 and 3b are approaching the loading position 2, traveling on the automatic traveling course 96a, leading to the face from the hopper. The control means of the unmanned dump truck 3 inputs the current position of the unmanned dump truck 3a by means of the receiver, and when it is determined that the unmanned dump truck 3a is in the loading area 91, the control means halts the unmanned dump truck 3 at a standby point 94 provided just before the entrance of the loading area 91 on the automatic traveling course 96a. When the preceding unmanned dump truck 3a runs along a loading course 96c, leading to the hopper, after completion of loading, and enters the inside of a designated area 95, provided on an automatic traveling course 96d, leading to the hopper, the unmanned dump truck 3, at the standby point 94, starts and travels along an automatic traveling course 96b into the loading area 91.

When the unmanned dump truck 3 at the standby point 94, judges that the preceding unmanned dump truck 3a has left the loading area 91 and is traveling on the automatic traveling course 96d, it starts from the standby point 94 and enters the inside of the loading area 91. Thereafter, the unmanned dump truck 3 reverses from the automatic traveling course 96b and stops at the loading position 2. As described above, interference and collision among the unmanned dump trucks 3, 3a, and 3b, in the loading area 91 are prevented.

Normally, after the loading operation, the loader 92 in the loading area 91 cleans up spilled earth and sand and makes preparations for the next loading at the loading position 2. It the next unmanned dump truck 3 enters the inside of the loading area 91 during the aforementioned operations, there is a danger that an interference or a collision between the unmanned dump truck 3 and the loader 92 may occur.

However, according to the aforementioned conventional method for preventing the entrance into a working area by traveling control, the next unmanned dump truck 3 enters the inside of the loading area 91 even when the loader 92 has not completed the preparations for loading. Accordingly, the operator of the loader 92 has to conduct preparing operation while confirming the position of the unmanned dump truck 3, which is advancing thereto. For this reason, the disadvantages of decreased operation efficiency of the loader 92, increased fatigue of an operator under excessive mental load, and greater risk of interference and collision with the unmanned dump truck 3 arise.

SUMMARY OF THE INVENTION

The present invention is made to eliminate the aforementioned disadvantages of the conventional art, and its object is to provide a method and an apparatus for preventing the entrance of an unmanned dump truck into a working area, so that an interference and a collision between unmanned dump trucks, or between a working vehicle and the unmanned dump trucks, are prevented.

A method and an apparatus for preventing the entrance of an unmanned dump truck into a working area, according to the present invention, include setting and storing an automatic traveling course of an unmanned dump truck; a working area which includes part of the automatic traveling course, and in which a working vehicle works; a standby point located on the automatic traveling course and just before the working area, wherein the unmanned dump truck transmits and receives position coordinate data to and from another unmanned dump truck during automatic traveling on the automatic traveling course; traveling on the automatic traveling course after confirming the position of each other; entering the inside of the working area, or waiting at the standby point; having a characteristic in that during automatic traveling, the unmanned dump truck enters the inside of the working area only when another unmanned dump truck is not in the working area and the working vehicle inside the working area issues an entrance permission command.

According to the aforementioned embodiment, when the unmanned dump truck is to enter a specified working area within the automatic traveling course, the unmanned dump truck can enter the working area only when another unmanned dump truck is not in the working area and the working vehicle in the working area (for example, loader or the like) issues an entrance permission command. If either of the aforementioned two conditions is not satisfied, specifically, if another unmanned dump truck is in the working area, or if an entrance permission command is not issued, the unmanned dump truck is halted at the standby point, which is provided just before the aforementioned working area, until these two conditions are satisfied. Therefore an interference and a collision between the unmanned dump trucks, or between the unmanned dump trucks and the working vehicle, are prevented. Therefore, operability of the working vehicle in the working area is improved, and the working load on the operator of the working vehicle can be reduced.

Further, in the aforementioned configuration, on setting the automatic traveling course, a round course return point may be set on the return way, where the unmanned dump truck heads for another working area from the present working area in a lateral direction from the standby point, wherein the working area may include the automatic traveling course from the standby point up to the round trip return point.

According to the aforementioned embodiment, the round trip return point is located on the aforementioned return way in a lateral direction from the standby point, therefore it can be automatically set. Accordingly, the part of the automatic traveling course, which is included in the working area, can be easily set, and a precise and safe working area can be set. As for the position "on the return way in a lateral direction from the standby point", a point on the return way at a shortest distance from the standby point, or a point on the return way, at a predetermined distance away from the standby point at a shortest distance from the standby point, is desirable.

An apparatus for preventing the entrance of an unmanned dump truck into a working area, according to the present invention, is an apparatus in which an unmanned dump truck includes position detecting means for detecting the position of the unmanned dump truck traveling on an automatic traveling course, part of which is included in a working area for a working vehicle; computing means for comparing the data of the aforementioned detected position to the position data previously stored and outputting commands to control the unmanned dump truck; traveling control means for controlling the unmanned dump truck based on the control commands; and a transmitter/receiver for transmitting the aforementioned position data, which are detected based on a command from the computing means, and for receiving the position data of another unmanned dump truck. The traveling control means allows the unmanned dump truck to enter the inside of the working area when another unmanned dump truck is not in the working area, wherein the working vehicle in the working area has an entrance permission means. The computing means outputs a control command to the traveling control means to allow the unmanned dump truck to enter the working area only when another unmanned dump truck is not in the working area and the entrance permission command for the unmanned dump truck is provided by the entrance permission means.

According to the aforementioned configuration, the unmanned dump truck enters the working area only when another unmanned dump truck is not in the working area and the entrance permission command is provided, therefore an interference and a collision in the working area can be prevented, operability of the working vehicle can be improved, and the load on the operator of the working vehicle can be reduced, as in the aforementioned method of the invention.

BEST MODE FOR CARRYING OUT THE INVENTION

Figure 2:
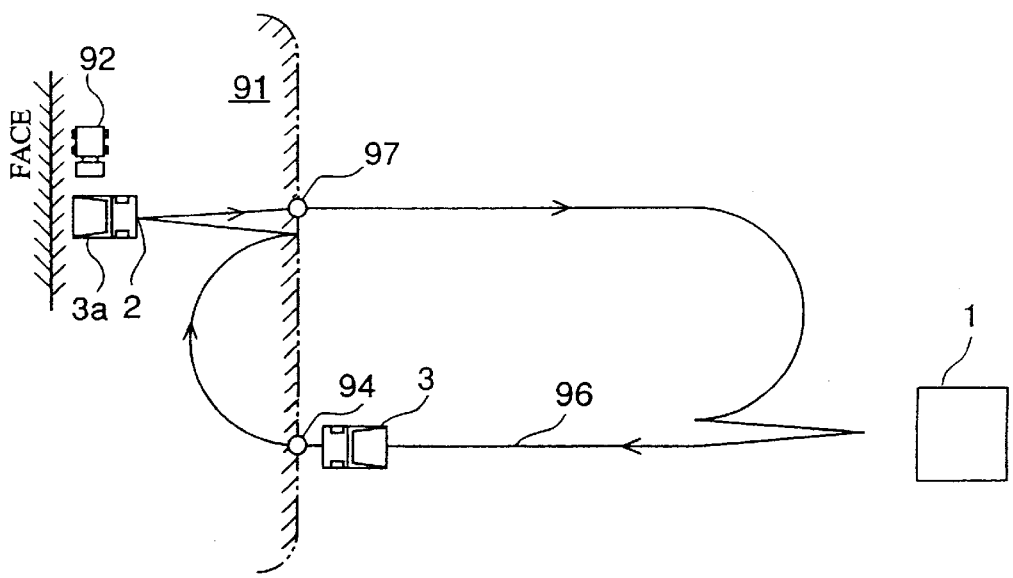
FIG. 2 is a schematic plan view of an automatic traveling course in accordance with the present invention.

A preferred embodiment of the present invention will be described in detail below with reference to the attached drawings. In the present embodiment, as FIG. 2 illustrates, a loader 92 is shown as an example of a working vehicle, and a loading area 91 where the loader 92 works is an example of a working area for the working vehicle.

Figure 1:
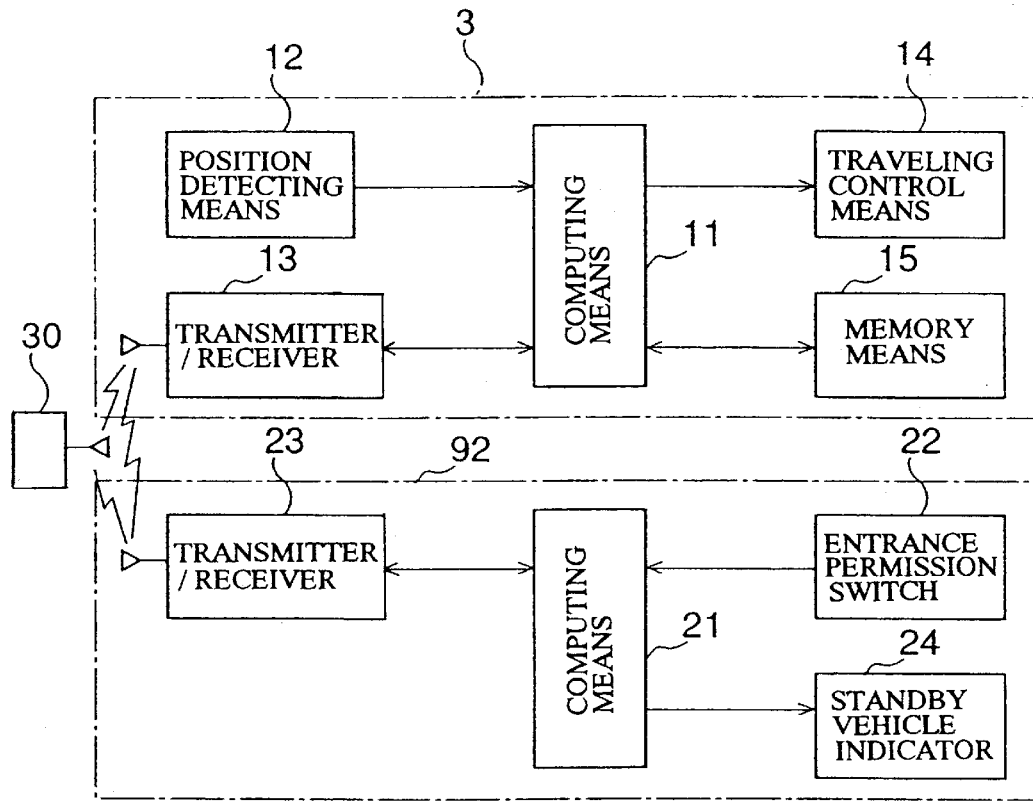
FIG. 1 is a block diagram of an apparatus for preventing the entrance of an unmanned dump truck in accordance with the present invention.

FIG. 1 illustrates a block diagram of an embodiment of an unmanned dump truck 3 and the loader 92. A computing means 11, of the unmanned dump truck 3, controls the entire automatic traveling, and can be primarily composed of an ordinary computer system, for example, a micro computer. A position detecting means 12 detects the position of the unmanned dump truck 3, in a coordinate system, on an automatic traveling course, and outputs the position data to the computing means 11. In the position detecting means 12, there are means for detecting an absolute coordinate position, by a GPS system or the like, and means for obtaining a relative coordinate position, from a known reference position, by computation, based on traveling direction data detected by a gyro or the like, and traveled distance data detected from the rotational frequency of wheels or the like. A traveling control means 14 controls the steering, vehicle speed, braking, and the like, of the unmanned dump truck 3, based on a command from the computing means 11. Specifically, the traveling control means 14 conducts, for example, steering control by a steering control motor, vehicle speed control by a transmission control valve and an acceleration control valve, braking control by a brake cylinder control valve, and the like.

Further, a memory means 15 stores coordinate data for an automatic traveling course 96 (see FIG. 2) at predetermined times, which are previously set by teaching or the like. During automatic traveling, the computing means 11 outputs a command to the traveling control means 14 to decrease the deviation between the stored coordinate data and the position data detected by the position detecting means 12. Thereby the traveling control means 14 controls traveling by controlling the steering, vehicle speed, braking and the like of the unmanned dump truck 3. A transmitter/receiver 13, of the unmanned dump truck 3 transmits the position data of the unmanned dump truck 3 to another unmanned dump truck 3a, which is inputted from the computing means 11 (see FIG. 2). The transmitter/receiver 13 receives the position data of the unmanned dump truck 3a from the unmanned dump truck 3a, and outputs the same data to the computing means 11. The transmitter/receiver 13 further receives an entrance permission command from the loader 92. The position coordinate data and each command may be transmitted or received by the transmitter/receiver 13 via a monitoring station 30, provided at a predetermined position within the unmanned dump truck driving system, or they may be directly transmitted or received without being relayed to the monitoring station 30.

In the loader 92, a computing means 21 controls the transmission to and reception from the unmanned dump truck 3, and is composed of an ordinary computer system similar to the computing means 11 of the unmanned dump truck 3. The computing means 21 transmits and receives command signals and position data to and from the computing means 11 via the transmitter/receiver 23 of the loader 92 and the transmitter/receiver 13 of the unmanned dump truck 3. An entrance permission switch (entrance permission means) 22 is a switch for the driver of the loader 92 to permit the entrance of the unmanned dump truck 3 into the loading area 91 (see FIG. 2). The computing means 21 inputs an actuating signal from the entrance permission switch 22, and transmits the entrance permission signal via the transmitter/receiver 23 when the actuating signal is set to "On". A standby vehicle indicator 24 indicates that the unmanned dump truck 3 is on standby at a standby point 94 (see FIG. 2) just before the loading area 91. The computing means 21 produces a decision based on the position data of each of the unmanned dump trucks 3 and 3a, which is received therein, and indicates that the unmanned dump truck 3 is on standby with the standby vehicle indicator 24, when the unmanned dump truck 3 is at the standby point 94. The indication may be given, for example, by using a lamp, or by showing a message on a graphic display device, such as a CRT.

FIG. 2 is an example of the automatic traveling course 96, wherein a plurality of unmanned dump trucks 3 and 3a are automatic traveling along the automatic traveling course 96 between a loading site 2 and an earth discharging site (another working area) 1. FIG. 2 shows a situation with two unmanned dump trucks 3 and 3a to simplify the explanation, but the same explanation is applicable for a situation with three or more unmanned dump trucks. The loader 92 works in the vicinity of the loading position 2 at the face, wherein the working area of the loader 92 is designated as the loading area 91. The standby point 94 is provided at a position just before the loading position 2, on the way along the automatic traveling course 96, leading to the loading position 2 from the earth discharging site 1. A round trip return point 97 is provided on the automatic traveling course 96, leading to the earth discharging site 1, from the loading position 2. The round trip return point 97 corresponds to an exit point from the loading area (working area) 91. In this embodiment, the area, which is in the vicinity of the automatic traveling course 96, from the standby point 94, via the loading position 2, to the round trip return point 97, is called the loading area 91.

The location of the standby point 94 is set during teaching, and a predetermined halting position is stored as the standby point 94 on the course, wherein forward movement is taught from the earth discharging site 1 to the loading position 2. The location of the round trip return point 97 may be obtained by computation, for example, as the position which is on the return way of the automatic traveling course 96, leading to the earth discharging site 1, from the loading position 2, and which is in a lateral direction from the standby point 94 (in FIG. 2, directly above the standby point 94). Specifically, after calculating the distance between each point on the automatic traveling course 96, from the loading position 2 to the discharging site 1 and the standby point 94, the point having the shortest distance from the standby point 94 may be the round trip return point 97. The location of the round trip return point 97 may be also a point on the return way at a predetermined distance from the standby point having the shortest distance from the standby point 94. The present embodiment has a method in which the loading area 91 is set during teaching as described above, but it is not restricted to this method. It is suitable to apply other methods, for example, in which the total teaching course data are read into an editing device (a personal computer or the like), which is installed in a predetermined place, after the completion of teaching, by writing the data to an IC card or the like, or by using data communications, in which the loading area 91 on the course data is designated by means of the course data edit function of the personal computer.

Figure 3:
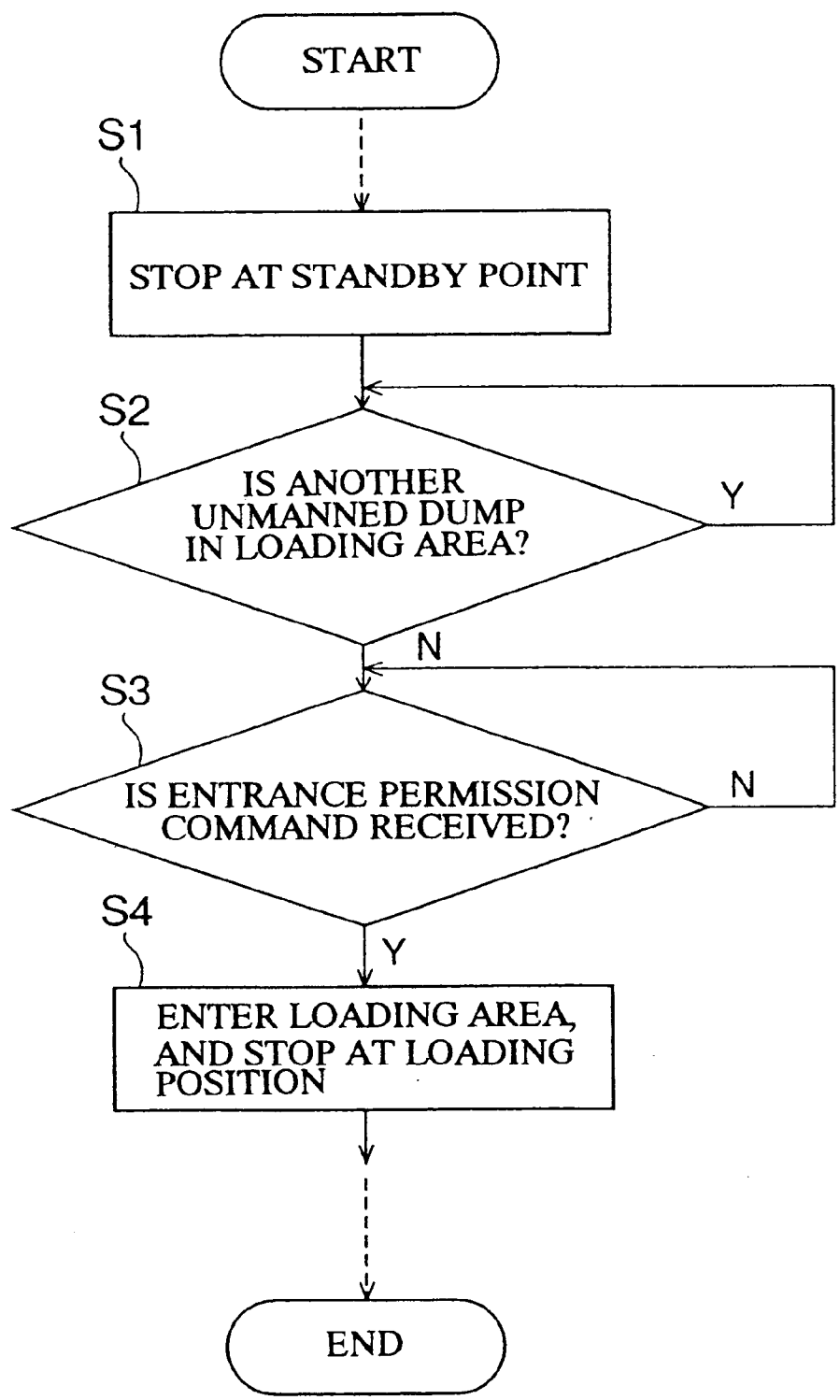
FIG. 3 is a flow chart of a method for preventing the entrance of an unmanned dump truck in accordance with the present invention.

Next, based on the flow chart in FIG. 3, the operation of the present embodiment is explained with reference to FIGS. 1 and 2. FIG. 3 shows a method for preventing the entrance of the unmanned dump truck 3 into the loading area 91. It should be noted that each step number is shown with a preceding "S", for example, "Step 1" is shown as "S1" in the following flow chart.

S1: After leaving the earth discharging site 1, the computing means 11 of the unmanned dump truck 3 compares the current position data, detected by the position detecting means 12 to the course data, previously stored in the memory means 15, and outputs steering and vehicle speed commands to the traveling control means 14, so as to decrease the deviation between the above data. Thus, the unmanned dump truck 3 heads for the loading area 91, from the earth discharging site 1, along the automatic traveling course 96. At the same time, the current position data of the unmanned dump truck 3 is transmitted to another unmanned dump truck 3a, or the like, and the loader 92, via the transmitter/receiver 13. When the unmanned dump truck 3 approaches the standby point 94, just before the position where the unmanned dump truck 3 enters the loading area 91, the computing means 11 outputs a braking command to the traveling control means 14 to decelerate the unmanned dump truck 3, and halts the dump truck 3 when it reaches the standby point 94.

S2: The computing means 11 receives the position data of another unmanned dump truck 3a, or the like, by means of the transmitter/receiver 13, and determines whether another dump truck 3a, or the like, is inside the loading area 91. When another unmanned dump truck 3a, or the like, is therein, control is returned to the beginning of S2 to wait until the dump truck 3a, or the like, leaves the loading area 91. When the dump truck 3a, or the like, is not therein, a command is given to proceed to S3.

S3: The computing means 11 determines whether an entrance permission command has been received from the loader 92 via the transmitters/receivers 23 and 13. When the permission command is not received, control is returned to the beginning of S3 to wait until the entrance permission command is received. When the permission command is received, a command is given to proceed to S4. The entrance permission command is transmitted by the driver of the loader 92. Specifically, before transmitting the entrance permission command, the operator of the loader 92 confirms the completion of the preparations for the next loading operation and checks whether the unmanned dump truck 3 on standby is at the standby point 94, by looking at the standby vehicle indicator 24. When the unmanned dump truck 3 is at the standby point, the driver of the loader 92 manipulates the entrance permission switch 22. The computing means 21 then transmits the entrance permission command from the transmitter/receiver 23 and permits the entrance of the next unmanned dump truck 3 into the loading area 91.

S4: The computing means 11 outputs a starting command to the traveling control means 14 and allows the unmanned dump truck 3 to enter the inside of the loading area 91. The computing means 11 allows the unmanned dump truck 3 to travel along the automatic traveling course 96 until it reaches the loading position 2, where the computing means 11 stops the unmanned dump truck 3 by issuing a braking command.

Thus, an interference and a collision between the unmanned dump trucks 3 and 3a, or the unmanned dump trucks 3 and 3a and the loader 92, in the loading area 91, can be prevented, and the traveling safety of the unmanned dump trucks 3 and 3a is improved. It should be noted that the present invention is not limited to an application in a loading area 91, but is applicable to any situation wherein interference between vehicles is prevented in working areas, for example, at an earth discharging site 1 and the like.

Figure 4:
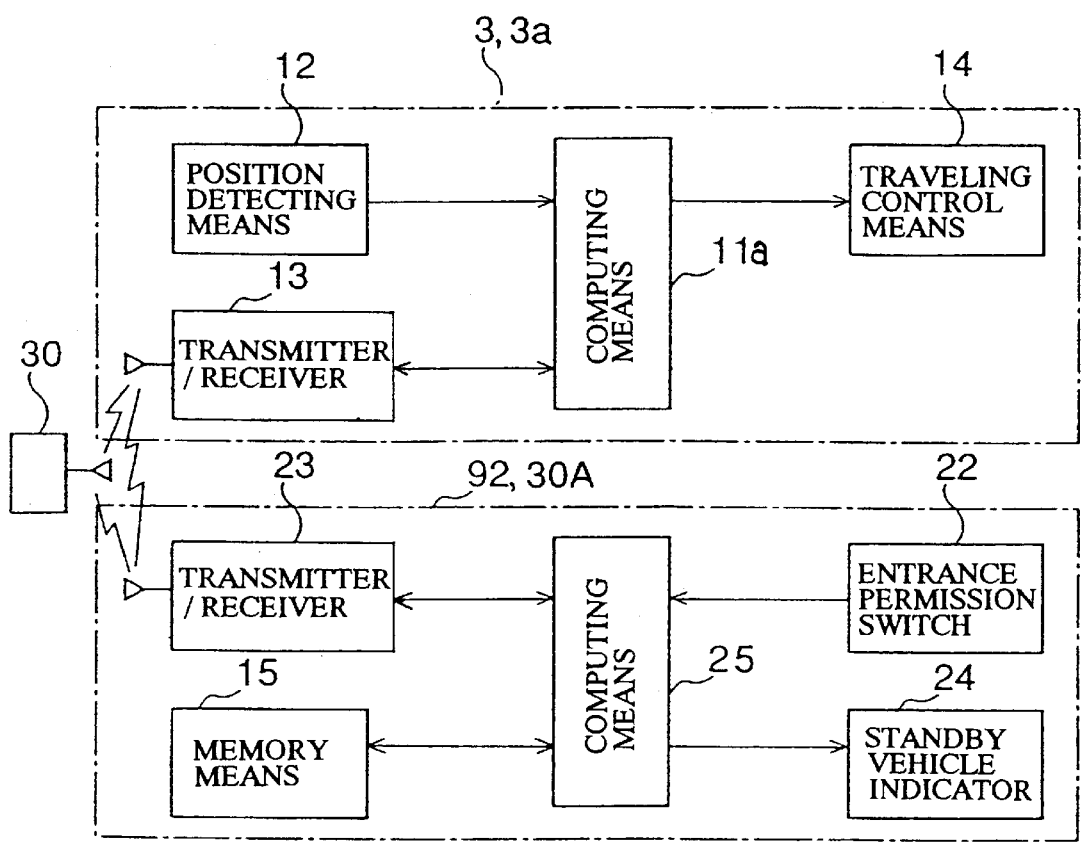
FIG. 4 is a block diagram of an apparatus for preventing the entrance of an unmanned dump truck in accordance with another embodiment of the present invention.
Figure 5:
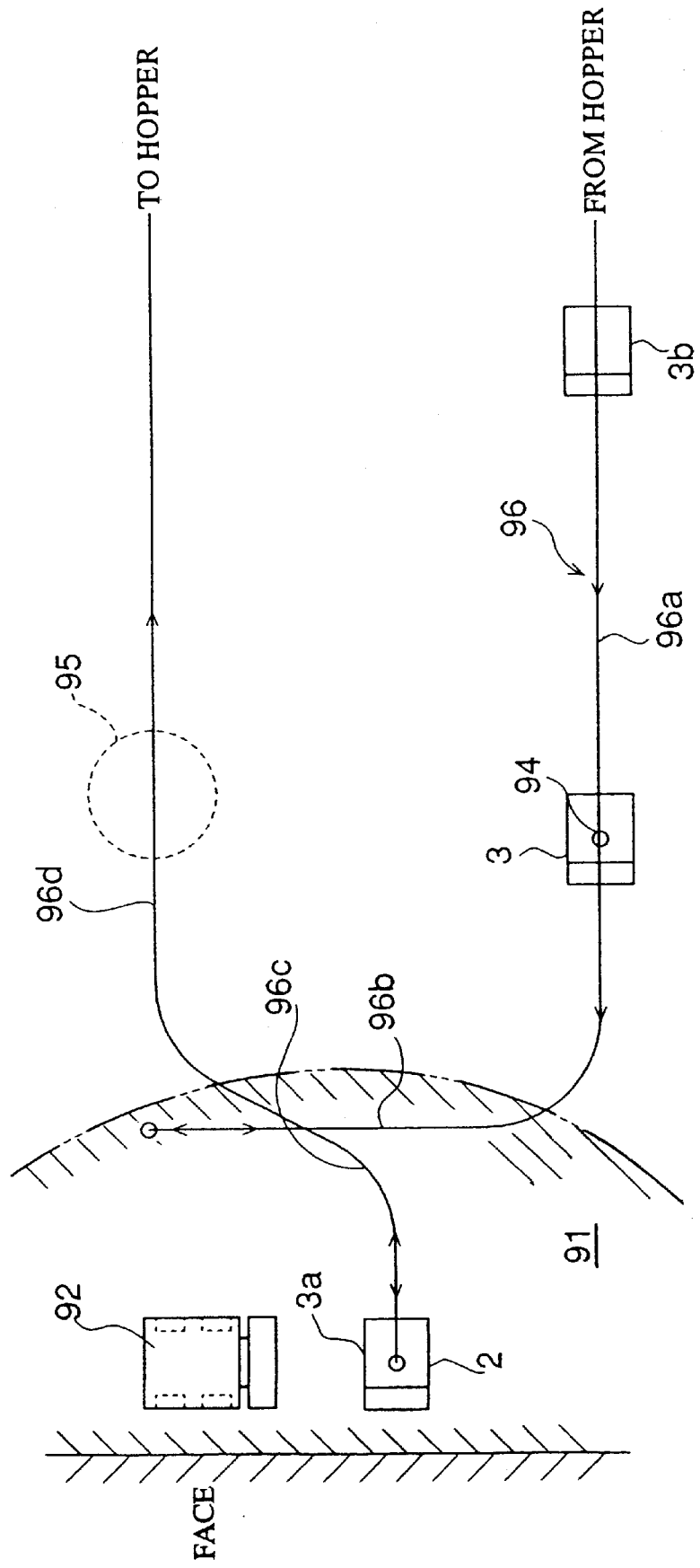
FIG. 5 is a schematic plan view of an automatic traveling course in accordance with the conventional art.

In the aforementioned embodiment, the computing means 11, which controls the entire automatic traveling of the unmanned dump trucks 3 and 3a, based on the position data of the unmanned dump trucks 3 and 3a and the entrance permission command, is located in the unmanned dump trucks 3 and 3a, but the location is not limited to the above. For example, as illustrated in FIG. 4, a computing means 25 may be disposed in a manned ground monitoring station 30A, provided in the unmanned dump truck driving system, or in the loader 92. In this embodiment, the computing means 25 comprises the computing means 21, to which the aforementioned entire automatic traveling control function of the computing means 11 is added. The ground monitoring station 30A or the loader 92 includes the transmitter/receiver 23; the entrance permission switch 22, which is manipulated by an operator; and the standby vehicle indicator 24, as well as the memory means 15, for storing the course data of the automatic traveling course 96. Meanwhile, the unmanned dump trucks 3 and 3a have computing means 11a, without the aforementioned entire automatic traveling control function, instead of the computing means 11 shown in FIG. 1, and omits the memory means 15 in FIG. 1.

In the aforementioned embodiment, the computing means 25 outputs a command to the traveling control means 14, via the transmitters/receivers 23 and 13 and the computing means 11a, so as to decrease the deviation between the course data stored in the memory means 15 and the position data detected by the position detecting means 12. When the unmanned dump truck 3, on standby, is at the standby point 94, and if the entrance permission command, notifying that another unmanned dump truck 3a is not inside the loading area 91, is outputted from the entrance permission switch 22, the computing means 25 issues a starting command to the traveling control means 14 of the unmanned dump truck 3, via the transmitters/receivers 23 and 13 and the computing means 11a, and allows the unmanned dump truck 3 to enter the loading area 91.

INDUSTRIAL APPLICABILITY

The present invention is useful as a method and an apparatus for preventing the entrance of an unmanned dump truck into a working area, so that an interference and a collision between unmanned dump trucks, or between a working vehicle and unmanned dump trucks, can be prevented.

What is claimed is:

1. An apparatus for preventing the entrance of an unmanned dump truck into a working area comprising:

position detecting means for detecting a position of said unmanned dump truck on an automatic traveling course;

memory means for storing position data corresponding to coordinate locations along said automatic traveling course;

traveling control means for controlling said unmanned dump truck;

entrance permission means for outputting an entrance permission command;

a first transmitter/receiver for transmitting said position data, detected by said position detecting means; for receiving position data of another unmanned dump truck; and for receiving said entrance permission command;

first computing means for storing said position data in said memory means; for comparing data outputted from said position detecting means to thus stored position data; for outputting control commands to said traveling control means; for controlling the transmitting and receiving of said first transmitter/receiver; and for determining whether another unmanned dump truck is within said working area;

a standby vehicle indicator for providing a standby vehicle indicator signal indicating that said unmanned dump truck is at a standby location on said automatic traveling course;

a second transmitter/receiver for transmitting said entrance permission command and receiving said standby vehicle indicator signal; and a second computing means for controlling the transmitting and receiving of said second transmitter/receiver; for sensing the state of said entrance permission means; and for changing the state of said vehicle standby indicator;

wherein said apparatus allows said unmanned dump truck to enter said working area only when said another unmanned dump truck is not in said work area and said entrance permission command has been received by said first computing means, and said position detecting means, said first computing means, said first transmitter/receiver, said traveling control means, and said memory means are disposed in said unmanned dump truck.

2. An apparatus for preventing the entrance of an unmanned dump truck into a working area, as claimed in claim 1, wherein said second transmitter/receiver, said second computing means, said entrance permission means, and said standby vehicle indicator are disposed in a working vehicle in said working area.

3. An apparatus for preventing the entrance of an unmanned dump truck into a working area, as claimed in claim 1, wherein said second transmitter/receiver, said second computing means, said entrance permission means, and said standby vehicle indicator are disposed in a manned ground monitoring station.

4. An apparatus for preventing the entrance of an unmanned dump truck into a working area comprising:

position detecting means for detecting a position of said unmanned dump truck on an automatic traveling course;

memory means for storing position data corresponding to coordinate locations along said automatic traveling course;

traveling control means for controlling said unmanned dump truck;

entrance permission means for outputting an entrance permission command;

a first transmitter/receiver for transmitting said position data, detected by said position detecting means; for receiving position data of another unmanned dump truck; and for receiving said entrance permission command;

first computing means for outputting control commands to said traveling control means, for controlling the transmitting and receiving of said first transmitter/receiver, and for determining whether another unmanned dump truck is within said working area;

a standby vehicle indicator for providing a standby vehicle indicator signal indicating that said unmanned dump truck is at a standby location on said automatic traveling course;

a second transmitter/receiver for transmitting said entrance permission command and receiving said standby vehicle indicator signal; and a second computing means for storing in said memory means said position data corresponding to coordinate locations along said automatic traveling course; for comparing data outputted from said position detecting means to thus stored position data; for controlling the transmitting and receiving of said second transmitter/receiver; for sensing the state of said entrance permission means; and for changing the state of said vehicle standby indicator;

wherein said apparatus allows said unmanned dump truck to enter said working area only when said another unmanned dump truck is not in said work area and said entrance permission command has been received by said first computing means, and said position detecting means, said first computing means, said first transmitter/receiver, and said traveling control means are disposed in said unmanned dump truck.

5. An apparatus for preventing the entrance of an unmanned dump truck into a working area, as claimed in claim 4, wherein said second transmitter/receiver, said second computing means, said entrance permission means, said memory means, and said standby vehicle indicator are disposed in a working vehicle in said working area.

6. An apparatus for preventing the entrance of an unmanned dump truck into a working area, as claimed in claim 4, wherein said second transmitter/receiver, said second computing means, said entrance permission means, said memory means, and said standby vehicle indicator are disposed in a manned ground monitoring station.

7. A method for preventing the entrance of an unmanned dump truck into a working area, comprising the steps of:

setting an automatic traveling course;

storing location data, corresponding to said automatic traveling course;

transmitting position data corresponding to the location of said unmanned dump truck along said automatic traveling course, from said unmanned dump truck to other unmanned dump trucks;

receiving position data corresponding to the location of one of said other unmanned dump trucks by said unmanned dump truck;

traveling said unmanned dump truck along said automatic traveling course;

stopping said unmanned dump truck at a standby vehicle location whenever at least one of said other unmanned dump trucks is in said working area and an entrance permission command has not been received by said unmanned dump truck; and permitting said unmanned dump truck to enter said working area only when no other unmanned dump trucks are in said working area and an entrance permission command has been received by said unmanned dump truck.

8. A method for preventing the entrance of an unmanned dump truck into said working area, as claimed in claim 7, further comprising the step of:

heading said unmanned dump truck to another working area from said working area in a lateral direction.

* * * * *